D6-502 AU 293 EX
NOR20 OR . RE 8,519
J. H. TRAVIS.
Assignor to M. & H. SCHRENKEISEN.
Covering for Chairs, &c.
No. 8,519. Reissued Design, Dec. 10, 1878.
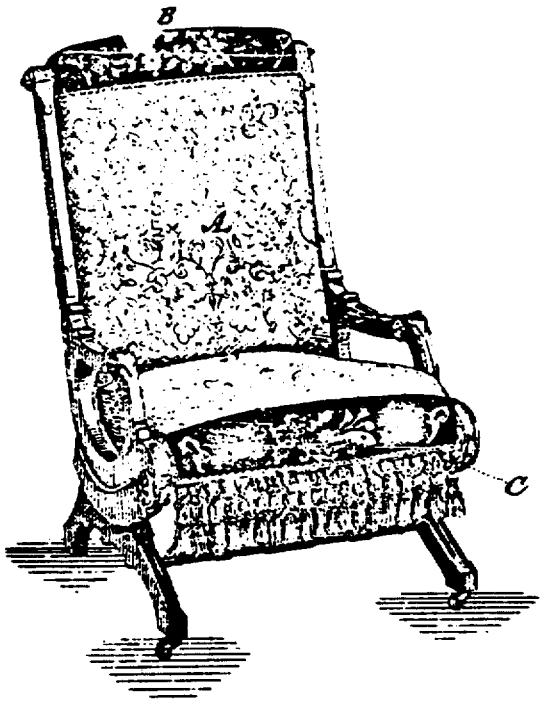
*Witnesses:*
T. C. Brecht.
A. H. Norris.
*Inventor:*
Joseph H. Travis.
By James L. Norris
Attorney.

UNITED STATES PATENT OFFICE.

JOSEPH H. TRAVIS, OF NEW YORK, N. Y., ASSIGNOR TO M. & H. SCHRENKEISEN.

DESIGN FOR COVERINGS FOR CHAIRS, &c.

Specification forming part of Design No. 10,753, dated July 9, 1878; Reissue No. 8,519, dated December 10, 1878; application filed November 29, 1878.

*To all whom it may concern:*

Be it known that I, JOSEPH H. TRAVIS, of the city, county, and State of New York, have originated and designed a Pattern or Design for Coverings for Chairs and Parlor Suits, of which the following is a full, clear, and exact description.

Chairs and parlor suits have heretofore been covered with fabrics of different materials of uniform color, and also with figured fabrics, except as to the upper part of the back and front part of the seat, which have been covered with strips or breadths of plain plush.

The design which I have originated differs essentially from these; and consists in having the back and seat of the chair or other article covered with a figured fabric, such as raw silk, which may be woven after or have on it any pattern desired, and having across the top or upper part of the back a strip or breadth of figured goods, usually comprising some complete pattern or figure, or with figured goods of another material or figure, differing in figure or pattern from that of the fabric with which the rest of the back is covered; also, in having the back and seat of a chair or other article covered with a figured fabric, as above described, and having along the front part of the seat a strip or breadth of figured goods, usually comprising some complete pattern or figure, or with figured goods of another material or figure, differing from that of the fabric with which the rest of the seat is covered; also, in having the back and seat of the chair or other article covered with a figured fabric, such as raw silk, which may be woven after or have on it any pattern desired, and having across the top or upper part of the back, and also along the front part of the seat, a strip or breadth of figured goods, usually comprising some complete figure or design, or with figured goods of another material or figure, differing from the figure or pattern of the fabric with which the rest of the back and seat are covered.

My design produces a very beautiful and elegant effect or appearance, and the article to which it is applied is thereby rendered highly attractive, æsthetically considered, as well as useful.

In the accompanying drawing, the letter A indicates that portion of the back and seat which is covered with uniform fabric, which may be of any pattern or design selected. The top or upper portion of the back, instead of being covered with the same material or with plain goods, is covered with figured goods B, preferably of plush, or with figured goods of another material or figure from the goods or material A.

The front portion of the seat, instead of being covered with the same fabric as the rest of the seat is covered with, or with plain goods, is covered with figured goods C, preferably of plush, or with figured goods of another material or figure from the goods A, covering the main body of the back and seat.

My design is more particularly intended for a peculiar style of rocker now made and sold by M. & H. Schrenkeisen, of the city of New York, under Letters Patent Nos. 156,127 and 177,754, but is adapted for other chairs and for parlor suits.

What I claim is—

1. A design for a material for covering chairs and parlor suits, consisting of a combination of figured goods or material with embroidered goods, or figured goods of another material or figure, the former being arranged to cover the main part of the seat and back, and the latter to lie across the upper part or top of the back, as herein shown and described.

2. A design for a material for covering chairs and parlor suits, consisting of a combination of figured goods or material with embroidered goods or figured goods of another material or figure, the former being arranged to cover the main part of the seat or back, and the latter to lie along the front part of the seat, as herein shown and described.

3. A design for a material for covering chairs and parlor suits, consisting of a combination of figured goods or material with embroidered goods, or figured goods of another material or figure, the former being arranged to cover the main part of the seat and back, and the latter to lie along the upper part of the back and the front of the seat, as herein shown and described.

In testimony whereof I have hereunto set my hand in the presence of two witnesses.

J. H. TRAVIS.

Witnesses:
JAMES L. NORRIS,
JAS. A. RUTHERFORD.